United States Patent [19]

Bauer et al.

[11] Patent Number: 4,823,238

[45] Date of Patent: Apr. 18, 1989

[54] AIR OUTLET DEVICE

[75] Inventors: Karl-Heinz Bauer; Gerold Eckert, both of Bad Neustadt/Saale, Fed. Rep. of Germany

[73] Assignee: Preh, Elektrofeinmechanische Werke, Jakob Preh, Nachf. GmbH & Co., Bad Neustadt/Saale, Fed. Rep. of Germany

[21] Appl. No.: 191,002

[22] Filed: May 6, 1988

[30] Foreign Application Priority Data

May 7, 1987 [DE] Fed. Rep. of Germany ....... 3715145

[51] Int. Cl.⁴ .......................... B60Q 3/02; F21V 33/00
[52] U.S. Cl. ......................................... 362/74; 362/96; 98/2
[58] Field of Search ........................ 362/61, 74, 96, 23, 362/29, 30, 253, 32; 98/2

[56] References Cited

U.S. PATENT DOCUMENTS

| | | | |
|---|---|---|---|
| 2,153,242 | 4/1939 | Dreyfuss | 362/74 |
| 2,775,184 | 12/1956 | Pipes | 98/2 |
| 3,305,168 | 2/1967 | Ramniceanu | 362/74 |
| 4,392,192 | 7/1983 | Steadman | 362/418 |
| 4,656,926 | 4/1987 | Bauer et al. | 98/2 |
| 4,664,023 | 5/1987 | Miyadera et al. | 98/2 |
| 4,734,918 | 3/1988 | Bauer et al. | 340/84 |

FOREIGN PATENT DOCUMENTS

| | | |
|---|---|---|
| 2814627 | 4/1979 | European Pat. Off. . |
| 2930769 | 1/1981 | European Pat. Off. . |
| 3535881 | 5/1983 | Fed. Rep. of Germany . |
| 3317807 | 10/1985 | Fed. Rep. of Germany . |

OTHER PUBLICATIONS

Patent Abstracts of Japan, Band 10, Nr. 349 (M-538) [2405], Nov. 26, 86; & JP-A-61 149 734 (Matsushita Electric Ind. Co., Ltd) 08-07-1986.

Primary Examiner—Ira S. Lazarus
Assistant Examiner—D. M. Cox
Attorney, Agent, or Firm—Wegner & Bretschneider

[57] ABSTRACT

An air outlet device including an air outlet channel having an open front and being located near an actuating part is provided with a plug base for a lamp behind the actuating part in a light-transmitting acceptance chamber. The lamp is to be replaceable from the front side without having to remove the actuating part toward the front. For this purpose the acceptance chamber is provided with a passage opening to the air outlet channel. The plug base is combined with a guide bead which, in the operating position, extends through the passage opening into the air outlet channel and ends at the front edge thereof as a handle. The plug base can be pulled through the air outlet channel and the passage opening out of the acceptance chamber and then be reintroduced into the latter.

9 Claims, 3 Drawing Sheets

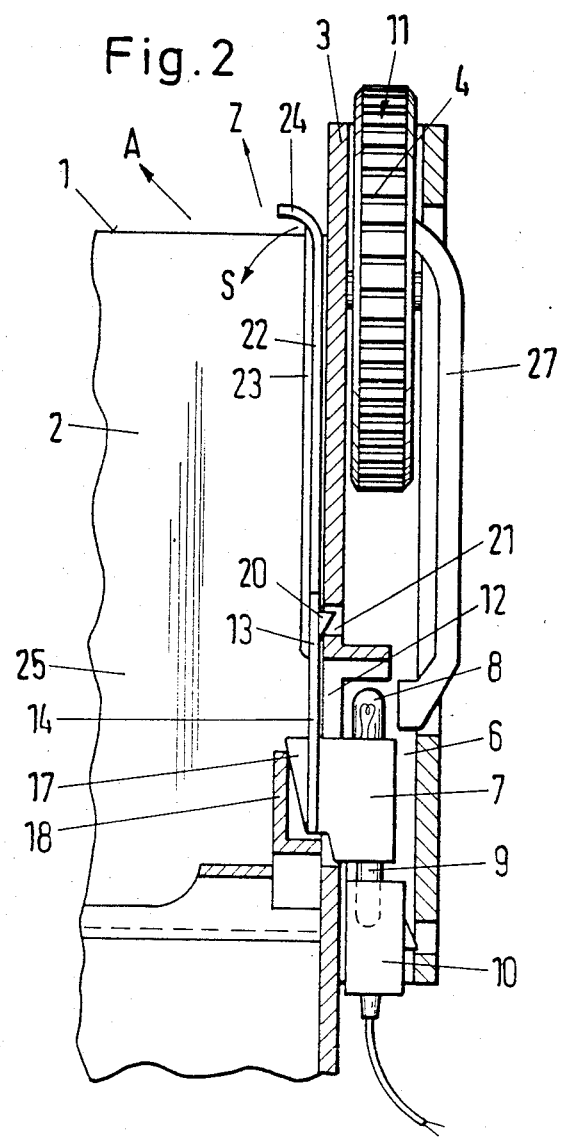

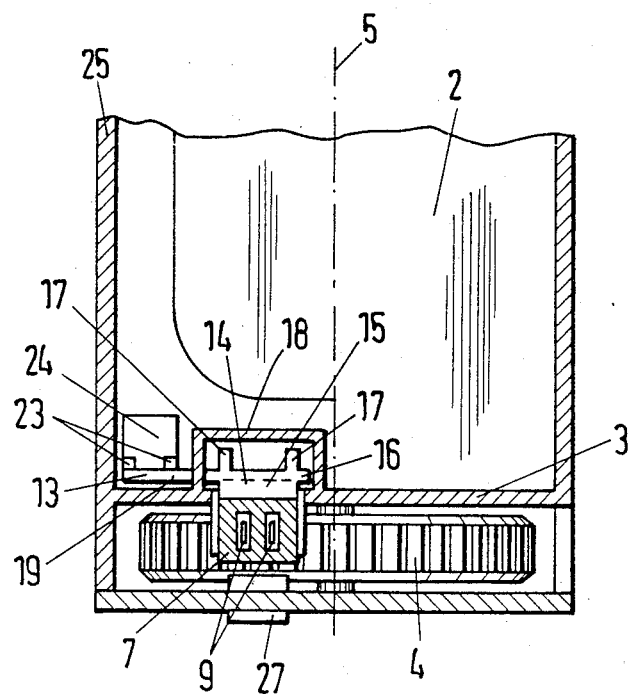

AIR OUTLET DEVICE

BACKGROUND OF THE INVENTION

The invention relates to an air outlet device comprising an air outlet channel which has an open front and is located near an actuating part for the operation of a closing flap. Behind the actuating part an acceptance chamber for the plugging base of a lamp is located which conducts light to the actuating part.

Such an air outlet device is used in motor vehicles. Its purpose is to provide the interior space of the vehicle with air. It is desired to illuminate the actuating part, which is usually a knurled wheel, so that the position of the actuating part of the closure flap can be easily recognized. The actuating part itself cannot be demounted from the front of the air outlet device.

DE-OS No. 33 17 807, which corresponds to U.S. Pat. No. 4 734 918, relates to a luminous band display device, an actuating part of which is illuminated from behind. If the lamp, which is located in a plug base, is defective, it can be replaced only from the back of the assembly. In practice this is very troublesome, so that often defective lamps are not replaced.

In DE-OS No. 35 35 881 an illumination device for a front panel is shown. With this model the lamp is located behind a removable cap on the front panel. After the cap has been removed the lamp can be changed from the front side. With an air outlet device of the type described above such a construction is not possible because the actuating part cannot be removed from the front side and because there is no additional space for the installation of a removable cap.

SUMMARY OF THE INVENTION

It is a feature of the invention to provide an air outlet device of the type described above whose lamp, which is located behind the actuating part, can be removed toward the front side although the actuating part itself cannot be removed from the front side.

According to the invention, this feature is achieved by providing the acceptance chamber with a passage opening to the air outlet channel, in that the plug base is provided with a guide bead which, in the operating position, extends through the passage opening into the air outlet channel and ends as a handle at the front edge of the air outlet channel, and in that by means of the guide bead the plug base can be pulled through the air outlet channel and through the passage opening out of the acceptance chamber and reintroduced into the latter.

The guide bead with its handle is located in the air outlet channel, which has an open front anyway, and can be grasped there. Thereby the plug base with the lamp can be pulled out toward the front side and set in from the front side without the actuating part itself having to be demounted.

In the following the invention is described in a more detailed way by means of an explanatory and non-limiting example.

BRIEF DESCRIPTION OF THE DRAWINGS

FIG. 2 shows a sectional view taken along line II—II in FIG. 1 and FIG. 3 shows a sectional view of the guide bead taken along line III—III in FIG. 1

DETAILED DESCRIPTION OF THE INVENTION

Figure 1:
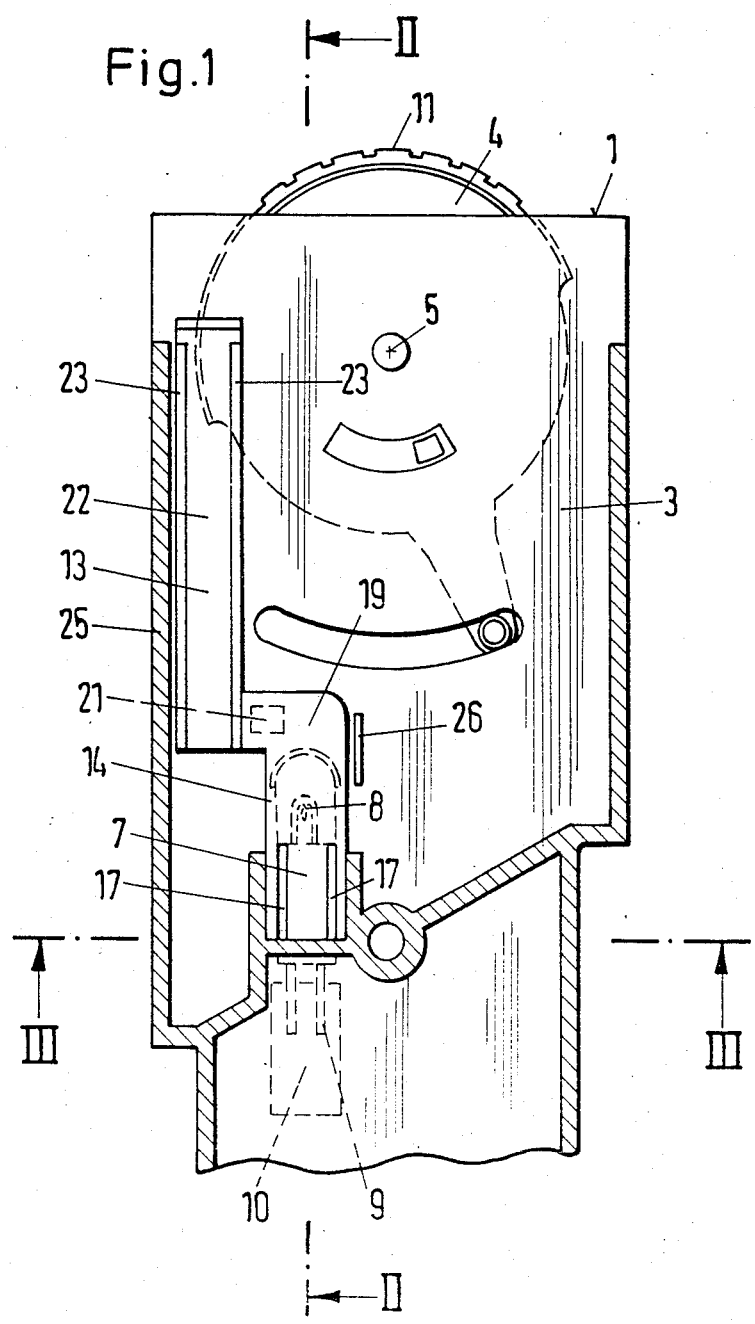
FIG. 1 shows a partial sectional view of an air outlet device in the portion of its partition wall between the air outlet channel and the actuating part.

An air outlet device is provided with an air outlet channel 2 which has an open front 1 and is defined by a partition or intermediate wall 3 at its side. In the air outlet channel 2 a closure flap—not shown in the drawings—is located which is to be operated by an actuating part 4 formed as a knurled wheel. The actuating part 4 is mounted rotatably around an axis 5 at the partition wall 3 and located on that side of the partition wall 3 which is away from the air outlet channel 2.

Behind the actuating part 4 there is an acceptance chamber 6 for a plug base 7 on which a lamp 8 is installed. The plug base 7 is provided with contacts 9 plugged into a socket 10. Between the acceptance chamber 6 and the actuating part 4 there is a light-transmitting connection not shown in the drawings which is formed, for example, by fiberoptical light guides 27 extending into a hollow space of the actuating part 4, by which the actuating part 4 is illuminated by the lamp 8 from behind. For the passage of air the actuating part 4 is provided with corresponding windows 11.

In the intermediate wall 3 between the acceptance chamber 6 and the air outlet channel 2 there is a passage opening 12.

An elastic guide bead 13, which is bent twice, is formed integrally with the plug base 7 (see FIG. 1). A first leg 14 thereof, which is connected with the plug base 7, is formed such that in the operating position shown in the drawing Figs. it covers the passage opening 12 so that the lamp 8 emits no light into the air outlet channel 2. For this purpose the leg 14 is provided with a prominence 15 fitting into the passage opening 12 and an edge 16 covering the passage opening 12 on the side of the air outlet channel 2.

The leg 14 is provided with entrance slopes 17 which, in the operating position, touch wall section 18. Thereby the guide bead 13 is pressed against the partition wall 3.

The leg 14 is followed by a cross part 19 provided with a lock-in nose 20 corresponding to recess 21 in partition wall 3. In the operating position the lock-in nose 20 snaps into the recess 21 so that the guide bead 13 is fixed and the plug base 7 is kept in the socket 10.

The cross part 19 is followed by a second leg 22. Just as the cross part 19 and the leg 14 it is located on that side of the partition wall 3 in the air outlet channel 2 which is remote from the actuating part 4. The second leg 22 is provided with longitudinal ribs 23 to stiffen it. At its one end which is close to the front side 1, it is provided with a hook 24 as a handle.

The second leg 22 of the guide bead 13 extends close to side wall 25 of the air outlet channel 2. Thus the side wall 25 is at the same time a guide for the leg 22. The intermediate wall 3 is provided with a rib 26 as a guide for the leg 14.

The handle 24 is installed in such a way in the air outlet channel 2 that it does not interfere with an air conducting blind installed in it from the front side.

If the lamp 8 is to be changed in the operating position shown in the drawings Figs., the guide bead 13 is swivelled at the hook 24 in the direction of the arrow S until the lock-in nose 20 has been moved out of the recess 21. Then the handle 24 is pulled in the direction of the arrow Z, thereby moving the contacts 9 out of the socket 10. Subsequently the guide bead 13 is swivelled further toward the arrow S and pulled at the front side 1 out of the air outlet channel 2 in the direction of the arrow A. Thereby, the plug base 7 with the lamp 8 is moved through the passage opening into the air outlet channel 2 and can be taken out together with the guide bead 13. Then the lamp 8 can be changed. Finally, the plug base 7 is pushed back through the passage opening 12 into the acceptance chamber 6. On the one hand, the side wall 25 thereby forms a guide for the leg 22 and, on the other hand, the rib 26 forms a guide for the leg 14. The entrance slopes 17 glide along the wall section 18 until the prominence 15 engages the passage opening 12 and the lock-in nose 20 snaps into the recess 21. Now the plug base 7 is kept firmly in the socket 10 together with its contacts 9.

What is claimed is:

1. An air outlet device comprising an air outlet channel which has an open front and is located near an actuating part for the operation of a closing flap, and wherein behind the actuating part an acceptance chamber for a plug base of a lamp is located for conducting light to the actuating part, wherein the acceptance chamber is provided with a passage opening to the air outlet channel, the plug base is provided with a guide bead which, in the operating position, extends through the passage opening into the air outlet channel and ends as a handle at the front of the air outlet channel, and wherein by means of the guide bead the plug base can be pulled through the air outlet channel and the passage opening out of the acceptance chamber and then reintroduced into the acceptance chamber.

2. An air outlet device according to claim 1, wherein in the operating position the guide bead is locked at an intermediate wall which is provided with a passage opening and runs between the actuating part and the air outlet channel.

3. An air outlet device according to claim 1 or 2, wherein in the operating position the guide bead is pressed against the intermediate wall by means of entrance slopes supported by a wall section.

4. An air outlet device according to claim 1 or 2, wherein the guide bead is elastic.

5. An air outlet device according to claim 1 or 2, wherein in the operating position the guide bead covers the passage opening.

6. An air outlet device according to claim 1 or 2, wherein a hook is formed as the handle at the end of the guide bead.

7. An air outlet device according to claim 1 or 2, wherein the guide bead is bent twice to form two legs, the first leg of the guide bead being formed as an integral part of the plug base and covering the passage opening in the operating position, and the second leg of the guide bead being provided with the handle, and a cross part being provided with a lock-in nose between the two legs.

8. An air outlet device according to claim 1 or 2, wherein one side wall of the air outlet channel forms a guide for the second leg.

9. An air outlet device according to claim 8, wherein a rib on the intermediate wall forms a guide for the first leg of the guide bead.

* * * * *